United States Patent Office 3,432,295
Patented Mar. 11, 1969

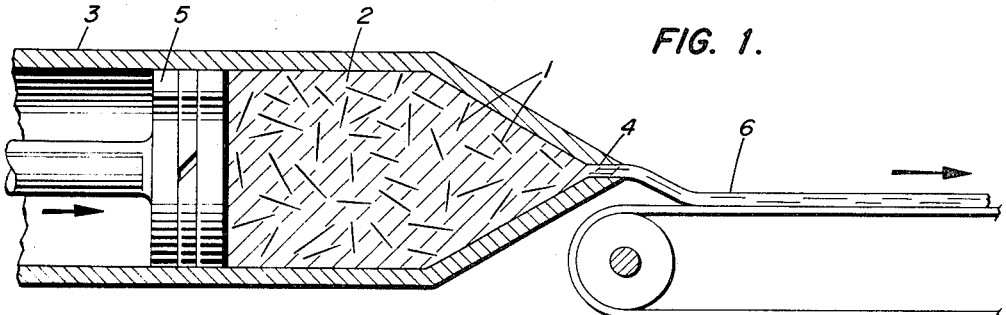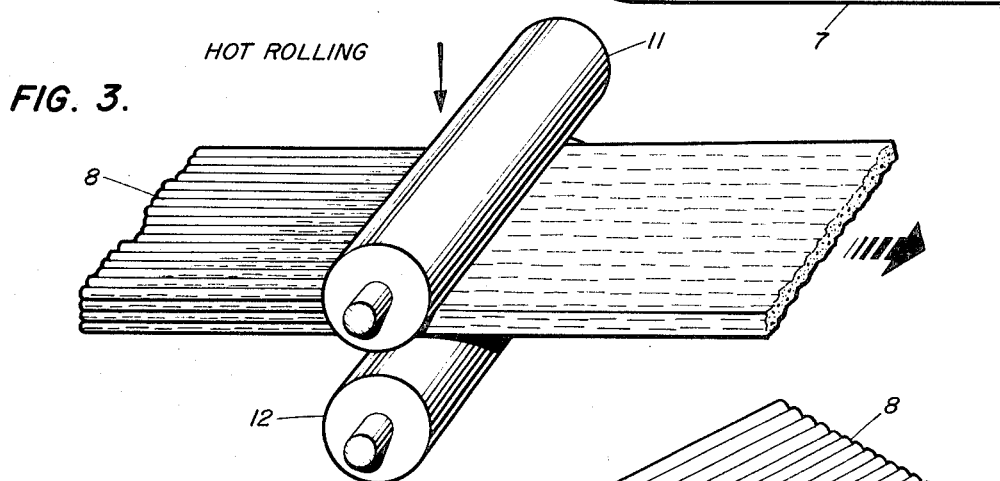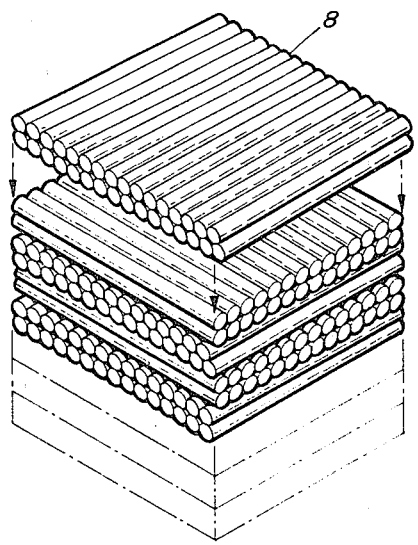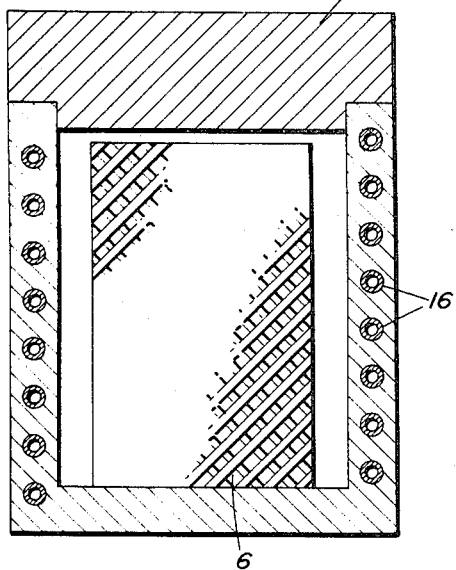

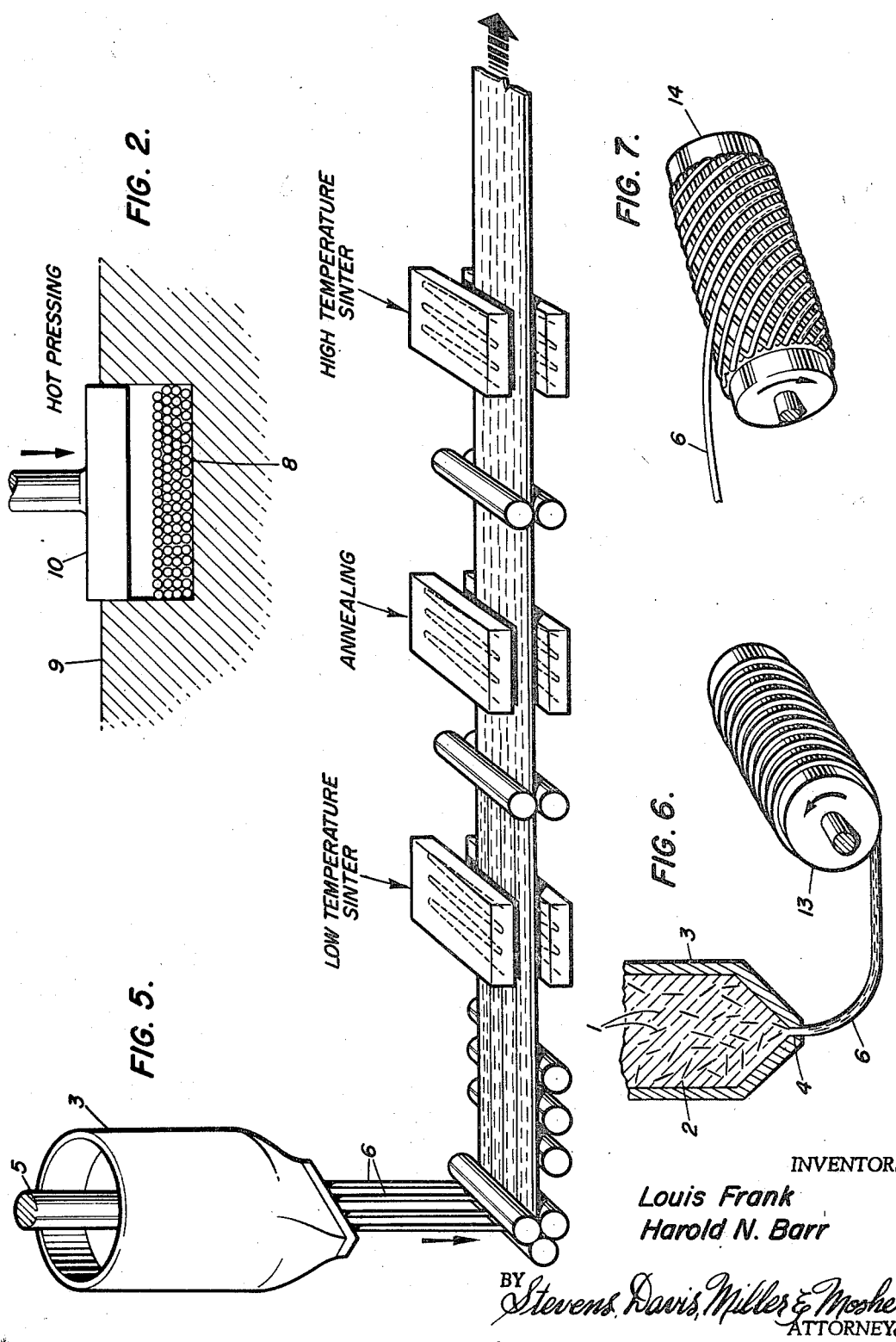

3,432,295
METHOD FOR MAKING ORIENTED FIBER OR WHISKER COMPOSITES
Louis Frank, and Harold N. Barr, Baltimore, Md., assignors to Hittman Associates, Inc., Baltimore, Md., a corporation of Maryland
Filed Dec. 8, 1966, Ser. No. 600,165
U.S. Cl. 75—206     15 Claims
Int. Cl. B22f 1/00, 9/00

ABSTRACT OF THE DISCLOSURE

The preparation of oriented fiber reinforced, metallic matrix composite structures by extruding with a large area reduction a mixture of reinforcing fibers, metal powder, inert medium and binder, thence forming the oriented extrusions thus obtained in a preselected shape, and hot pressing the same to consolidate the structure.

---

The present invention relates to a method for making fiber or whisker reinforced metallic composites and to the structures resulting therefrom. More particularly, the invention relates to a process for the preparation of metal matrix, fiber or whisker reinforced composites, including continuous tape structures, wherein the reinforcing fibers or whiskers are uniformly dispersed and are wholly oriented or aligned, to the fiber or whisker reinforced metallic composites resulting from such process, and to certain composite precursor structures.

It is known in the prior art that fibers and single crystal whiskers of many materials have very high tensile strengths and elastic moduli which in many cases approach the theoretical values for these materials. These fibers and whiskers offer considerable potential for the strengthening of metallic materials by their incorporation into the metal to form a metal-fiber or a metal-whisker composite. However, in order to take full advantage of the high strength and elastic modulus of the fiber or whisker in a metal matrix, it is important to develop a bond between the fiber or whisker and matrix material, and, in addition, the fibers or whiskers should be aligned in the direction of the applied load and the fibers or whiskers should be well dispersed in the matrix. It has been shown that a random distribution of fibers or whiskers in a plane is only one-third as effective as a completely oriented distribution of fibers or whiskers, insofar as contributing to the ultimate strength and stiffness of the particular composite under consideration is concerned.

In most studies reported on composite fabrication development, the dispersion and alignment of the short single crystal whiskers in the metal matrix has presented a formidable problem. Some composites have been made by vacuum infiltration of the metal matrix (e.g., silver, aluminum, nickel) into bundles of sapphire whiskers; however, this method has severe limitation because of the reactivity of the molten metal, poor alignment of short whiskers and non-uniform dispersion of the whiskers in the matrix. Other techniques such as centrifugal casting, pressure casting, and powder metallurgical compacting and sintering are being employed for the fabrication of composites but none as yet demonstrate any degree of success in preparing a well bonded whisker-metal composite with aligned and uniformly dispersed whiskers. The preparation of small composite samples containing oriented whisker consisting of premetallized sapphire whiskers in a nickel matrix has recently been reported. This has been accomplished by electrodepositing nickel in the spaces between the whiskers in a prepared bundle. Here again the problem of preparing the bundles consisting of whiskers 0.05 to 0.5 inch in length will not easily permit the fabrication of larger composites.

Further, it is also known in the art according to McDanels et al., United States Patent No. 3,084,421, to provide ostensibly oriented fiber reinformed metallic composites by flowing a metallic matrix into the spaces existing between the fibers of a bundle of potentially reinforcing materials. For all intents and purposes, however, this process is substantially unique with respect to copper-tungsten systems because molten copper will not attack tungsten as, e.g., molten nickel would attack quartz, but rather will wet the same leading to filling of the interstices by virtue of the unique surface tension of copper upon tungsten. Moreover, such a process does not lend itself to the formation of composites wherein the fibrous reinforcements are wholly oriented and uniformly dispersed within the matrix, viz, gravity flowing a molten metal matrix into a bundle of fibers necessarily disrupts the density and the orientation thereof (which was already crude due to its dependency upon the shape of the orienting container); and likewise does not lend itself to the formation of composites from systems wherein the molten metal of the prospective matrix will not wet the fiber or whisker component.

Accordingly, an object of the present invention is that of providing a novel and nonobvious method for the preparation of metal matrix fiber or whisker reinforced composites wherein the reinforcing fibers or whiskers are uniformly dispersed and are wholly oriented or aligned in a given direction, or are biaxially, triaxially or polyaxially oriented within the matrix material and wherein there is further developed a strong bond between the metallic matrix and each of the individual fibers or whiskers dispersed therein.

Another object of the invention is that of providing high strength, homogeneous, oriented fiber or whisker reinforced metallic composites.

Other objects and advantages of this invention shall become apparent from the description which follows.

The objects of the present invention, briefly stated, are accomplished by preparing a blended slurry of the fibers or whiskers which ultimately provide the composite reinforcement, a powder of the metal which ultimately provides the matrix for the composite, a suitable inert liquid medium such as, for example, water, and a suitable binder for the aforesaid components such as, for example, methylcellulose, guar gum or polyvinyl alcohol based organic binders.

The resultant slurry is thence dried to a plastic consistency and extruded with a large area ratio, e.g., 100:1 or higher, through a fine orifice extrusion die, e.g., a die provided with an orifice whose diameter is less than the lengths of the reinforcing fibers or whiskers, to align the said fibers or whiskers. Furthermore, a small amount of glycerin can be further included in the initial blended slurry to maintain a more readily workable plastic consistency product, if necessary.

The extrusion variable will depend on the fiber or whisker size and on the resultant composite structure required and can be adjusted accordingly. Variations in binder content can also be made to optimize properties in the extruded rods.

The extruded rods may be air dried to improve their strength if necessary. The material may be used to develop a useful structure in many ways; i.e., parallel winding on a mandrel, laying cut lengths into a die cavity in parallel or criss-cross array, followed by a suitable treatment to remove the binder and densify the residual metal powders and reinforcing fibers; e.g., hot pressing. In this manner, the fiber orientation created during extrusion is preserved in the final part and the fibers may be preferentially aligned with the principal stresses in the part.

This process has been used for successfully orienting discontinuous fibers or whiskers in metal matrices with fiber or whisker contents of up to 50 volume percent.

The present invention is more fully explained by reference to one constructional example shown in the accompanying drawings, which illustrate diagrammatically in FIGS. 1–4 one embodiment of an apparatus and process for the fabrication of fiber or whisker reinforced metallic composites.

Referring specifically to FIG. 1, a plastic consistency mass obtained by drying a blended slurry of fibers or whiskers 1, powdered metal, inert liquid medium and binder 2 is placed in a fine orifice extrusion die 3 and thence extruded in response to forward motion of plunger 5 through the fine orifice 4 of the said die 3 whereupon the said fibers or whiskers are aligned.

The resultant extrusion 6 is advanced by means of conveyor 7 to an air drying stage.

The dried extrudate is then cut into given lengths, and a number of these sections 8 (FIG. 2) are stacked into a graphite or steel die 9, as depicted in FIG. 2, and hot pressed via pressing means 10 to produce a dense body with a high degree of orientation and to bond the fiber-metal matrix or whisker-metal matrix.

An alternate mode of hot working is that represented in FIG. 3 wherein an advancing train of sections 8, suitably preheated and protected from oxidation, if necessary, is squeezed between rolls to effect consolidation.

The number of sections 8 can be stacked into the hot pressing die 9 or squeezed between heated rolls 11 and 12 while in a parallel configuration (FIGS. 2 and 3) or in a biaxial, triaxial or any other polyaxial configuration.

FIG. 4 illustrates just such a biaxial configuration.

In order to further illustrate the present invention and the advantages thereof, the following specific examples are given, it being understood that these are merely intended to be illustrative and not limitative.

Example I

Here follows a stepwise process for producing a 10 volume percent quartz fiber reinforced, nickel metal matrix composite. There were weighed out 26.5 grams of quartz fibers ranging from 1/8 inch to 1/4 inch long and having diameters of from 0.0005 to 0.001 inch, 150 ml. of water and 3.3 grams of a methylcellulose binder-plasticizer (marketed under the trade name of Methocel), mixed with a 70/30 solution of alcohol and water.

These were blended with 80.1 grams of nickel metal powder in a high speed liquid blender in the following order: water, fiber, binder and metal powder.

The resultant slurry was then dried to a plastic consistency, and the plastic mass was extruded through the extrusion apparatus schematically shown in FIG. 1 and having a die diameter of 0.040 inch.

The extrudate was then dried in air and the aligned extrusions placed in the hot press die of FIG. 2 and hot pressed at 1000° C. and under one t.s.i. for one-half hour.

Examples II to V

Following the procedure outlined in Example I, there were also prepared four additional material combinations of nickel matrix and 20, 30, 40 and 50 volume percent, respectively, quartz ($SiO_2$) fiber.

Example VI

Again following the stepwise procedure as outlined in Example I, there was prepared a 10 volume percent quartz fiber reinforced cobalt metal matrix composite from 1.1 grams of quartz ($SiO_2$) fibers dispersed in 150 ml. of water, 36.6 grams of cobalt metal powder and 1.8 grams of gel binder-plasticizer (marketed under the trade name of Jaguar). The hot pressing was at 1050° C. and under one t.s.i. for 25 minutes.

Example VII

The procedure of Example VI was repeated with 2.2 grams of quartz ($SiO_2$) fibers dispersed in 150 ml. of water, 36.6 grams of cobalt metal powder and 1.8 grams of Jaguar to prepare a 20 volume percent quartz fiber reinforced cobalt metal matrix composite. The hot pressing was accomplished at 1000° C. and under two t.s.i. for one-quarter hour, and the sample exhibited a density approaching that of theoretical density.

Example VIII

The procedure of Example VI was repeated with 3.3 grams of quartz ($SiO_2$) fibers dispersed in 150 ml. of water, 36.6 grams of cobalt metal powder and 1.8 grams of Jaguar to prepare a 30 volume percent quartz fiber reinforced cobalt metal matrix composite. The hot pressing was as in Example VII, and the sample exhibited a density approaching that of theoretical density.

Example IX

The procedure of Example VI was again duplicated with 4.4 grams of quartz ($SiO_2$) fibers dispersed in 170 ml. of water, 36.6 grams of cobalt metal powder and 2.0 grams of Jaguar to prepare a 40 volume percent quartz fiber reinforced cobalt metal matrix composite. The hot pressing was as in Example VII, and the sample exhibited a density approaching that of theoretical density.

Example X

The procedure of Example VI was again duplicated with 5.5 grams of quartz ($SiO_2$) fibers dispersed in 180 ml. of water, 36.6 grams of cobalt metal powder and 2.2 grams of Jaguar to prepare a 50 volume percent quartz fiber reinforced cobalt metal matrix composite. The hot pressing was in Example VII.

Example XI

Again following the stepwise procedure, as outlined in Example I, there was prepared a 10 volume percent zirconia ($ZrO_2$) whisker reinforced nickel metal matrix composite from 1.3 grams of zirconia whiskers, 16.2 grams of nickel metal powder and 4 weight percent of a Jaguar binder to which had been added 20 cc. of water. Extrusion was through a die having an orifice diameter of 0.0625 inch and the hot pressing was at 1025° C. and under 1 t.s.i. for twenty-five minutes.

Examples XII to XV

Following the procedure outlined in Example XI, there were prepared four additional material combinations of nickel matrix and 20, 30, 40 and 50 volume percent, respectively, zirconia ($ZrO_2$) whisker.

Examples XVI to LX

Again following the procedure as outlined in Example I, there were prepared five material combinations of each of several metal matrix and 10, 20, 30, 40 and 50 volume percent, respectively, metal or non-metallic fiber or whisker. These combinations were:

Nickel-carbon fiber
Nickel-alumina ($Al_2O_3$) whisker
Nickel-alumina ($Al_2O_3$) fiber Nickel-molybdenum fiber
Platinum-quartz ($SiO_2$) fiber
Platinum-alumina ($Al_2O_3$) whisker
Platinum-alumina ($Al_2O_3$) fiber
Molybdenum-quartz ($SiO_2$) fiber
Aluminum-quartz ($SiO_2$) fiber In addition to the metal matrix materials hereinbefore mentioned, other matrix metal materials may also be used. Such metal materials include Nichrome alloy, stainless steel, silver, titanium, titanium alloys, aluminum alloys, e.g., aluminum with small percentages of copper or silicon, magnesium and magnesium alloys. Moreover, the above alloys can be provided either as prealloyed powders or as mixtures of elemental powders.

As additional reinforcing fibers or whiskers, there may also be mentioned tungsten, boron, silicon carbide, beryllium oxide, silicon nitride and boron carbide, as well as others.

A modification of the above process was used to prepare long lengths of fiber or whisker reinforced metal tape in which the fibers or whiskers are aligned in the direction parallel to the tape length. The process here consists of simultaneous extrusion of a number of rods, forming the rods into a tape by passing through a forming roll followed by alternate sintering and rolling operations to densify the tape.

In FIG. 5, there is schematically shown the process and apparatus for fabricating continuous fiber or whisker reinforced tape with the reference numerals, as aforesaid.

A method for making composite structure by filament winding techniques is diagrammatically illustrated in FIGS. 6, 7 and 8. The basic slurry extrusion 6 is wound on a take-up drum 13 (FIG. 6).

The extrusion 6 is then wound on a mandrel 14 to achieve the desired shape and orientation of the fibers or whiskers which have been previously aligned during the extrusion step (FIG. 7).

Densification of the wound extrusion into an integral shape is accomplished by placing the same in a pressure chamber 15 equipped with a plurality of heating coils 16 and by subjecting the same to hot isostatic pressing therein (FIG. 8). In this processes, as is well known to those skillful in the art, the object to be densified is jacketed with a thin walled, evacuated metallic cover so that the pressure of the working fluid within the pressure vessel may be applied uniformly to the work.

In like manner, there can also be fabricated, e.g., composite fiber or whisker reinforced cone and nozzle structures.

As many apparently widely different embodiments of this invention may be made without departing from the spirit and scope thereof, it is to be understood that the same is not be limited to the specific embodiments thereof, except as defined in the appended claims.

What is claimed is:

1. A method for the preparation of an oriented fiber reinforced, metallic matrix composite structure, comprising blending a slurry essentially consisting of discontinuous reinforcing fibers, powdered matrix metal, an inert liquid medium and a binder; drying the said blended slurry to a plastic consistency; thence extruding the same with a large area ratio through an orifice, the diameter of which orifice being less than the lengths of the reinforcing fibers, whereby there is simultaneously effected an orientation of the said fibers along the axis of extrusion; drying the oriented extrusion thus obtained; forming oriented extrusions in the desired shape of a preselected article of manufacture with the orientation axes of the extrusions correlated with the anticipated stresses to be experienced by said article of manufacture in use; and hot pressing the same at elevated temperatures to consolidate the structure and bond the fiber-metal matrix.

2. A method for the preparation of an oriented whisker reinforced, metallic matrix composite structure, comprising blending a slurry essentially consisting of discontinuous reinforcing whiskers, powdered matrix metal, an inert liquid medium and a binder; drying the said blended slurry to a plastic consistency; thence extruding the same with a large area ratio through an orifice, the diameter of which orifice being less than the lengths of the reinforcing whiskers, whereby there is simultaneously effected an orientation of the said whiskers along the axis of extrusion; drying the oriented extrusion thus obtained; forming oriented extrusions in the desired shape of a preselected article of manufacture with the orientation axes of the extrusions correlated with the anticipated stresses to be experienced by said article of manufacture in use; and hot pressing the same at elevated temperatures to consolidate the structure and bond the whisker-metal matrix.

3. The method of claim 1, wherein the area rato of extrusion is at least 100:1.

4. The method of claim 2, wherein the area ratio of extrusion is at least 100:1.

5. The method of claim 1, wherein the powdered matrix metal is selected from the group consisting of nickel, cobalt, platinum, molybdenum and aluminum powder.

6. The method of claim 5, wherein the reinforcing fibers are selected from the group consisting of quartz, carbon, alumina and molybdenum fibers.

7. The method of claim 2, wherein the powdered matrix metal is selected from the group consisting of nickel, cobalt, platinum, molybdenum and aluminum powder.

8. The method of claim 7, wherein the reinforcing whiskers are selected from the group consisting of zirconia and alumina whiskers.

9. The method of claim 1, wherein the reinforcing fibers range from ⅛ inch to ¼ inch in length and from 0.0005 to 0.001 inch in diameter.

10. A method for the preparation of a fiber reinforced metal tape, comprising forming a rod of an oriented fiber reinforced, metallic matrix composite structure precursor essentially consisting of a plastic consistency elongated unit mass of a homogeneous dispersion of discontinuous fibers substantially wholly oriented along the axis of elongation in a wetted powdered metal matrix, passing said rod through a forming roll to effect a tape structure thereof and thence alternately sintering and rolling the same to densify the tape.

11. A method for the preparation of a whisker reinforced metal tape, comprising forming a rod of an oriented whisker reinforced, metallic matrix composite structure precursor essentially consisting of a plastic consistency elongated unit mass of a homogeneous dispersion of discontinuous whiskers substantially wholly oriented along the axis of elongation in a wetted powdered metal matrix, passing said rod through a forming roll to effect a tape structure thereof and thence alternately sintering and rolling the same to densify the tape.

12. The method of claim 10, wherein there are simultaneously formed a number of the said rods which are simultaneously formed into tape structures and simultaneously alternately sintered and rolled.

13. The method of claim 11, wherein there are simultaneously formed a number of the said rods which are simultaneously formed into tape structures and simultaneously alternately sintered and rolled.

14. A method for the preparation of high strength shaped composite structures, comprising selectively winding on a mandrel to achieve the shape desired rods of an oriented fiber reinforced, metallic matrix composite structure precursor essentially consisting of a plastic consistency elongated unit mass of a homogeneous dispersion of discontinuous fibers substantially wholly oriented along the axis of elongation in a wetted powdered metal matrix and hot pressing the same to densify the said shaped composite structure.

15. A method for the preparation of high strength shaped composite structures, comprising selectively winding on a mandrel to achieve the shape desired rods of an oriented whisker reinforced, metallic matrix composite structure precursor essentially consisting of a plastic consistency elongated unit mass of a homogeneous dispersion of discontinuous whiskers substantially wholly oriented along the axis of elongation in a wetted powdered metal matrix and hot pressing the same to densify the said shaped composite structure.

References Cited

UNITED STATES PATENTS

| | | | |
|---|---|---|---|
| 2,699,415 | 1/1955 | Nachtman. | |
| 3,091,026 | 5/1963 | Hill et al. | 29—420.5 X |
| 3,152,389 | 10/1964 | Alexander et al. | 75—206 |
| 3,167,427 | 1/1965 | Slayter | 75—201 |
| 3,218,697 | 11/1965 | Wainer | 75—206 |
| 3,278,279 | 10/1966 | Kraft et al. | 75—200 X |
| 3,324,541 | 6/1967 | Luiten et al. | 75—214 X |
| 3,335,002 | 8/1967 | Clarke | 75—214 X |
| 3,337,337 | 8/1967 | Weeton et al. | 75—200 |

FOREIGN PATENTS

| | | |
|---|---|---|
| 688,497 | 6/1964 | Canada. |
| 926,911 | 5/1963 | Great Britain. |

BENJAMIN R. PADGETT, *Primary Examiner.*

A. J. STEINER, *Assistant Examiner.*

U.S. Cl. X.R.

29—420.5; 75—208, 214